United States Patent [19]

Nelson et al.

[11] Patent Number: 5,338,061
[45] Date of Patent: Aug. 16, 1994

[54] AIR BAG HAVING DOUBLE-WALL CONSTRUCTION

[75] Inventors: Steven R. Nelson, Grove City; Gregory Swiderski, Dublin, both of Ohio

[73] Assignee: Daicel Chemical Industries, Ltd., Tokyo, Japan

[21] Appl. No.: 865,311

[22] Filed: Apr. 8, 1992

[51] Int. Cl.⁵ .............................................. B60R 21/24
[52] U.S. Cl. .................................... 280/729; 280/738
[58] Field of Search .............. 280/728, 729, 738, 743

[56] References Cited

U.S. PATENT DOCUMENTS

| | | | |
|---|---|---|---|
| 3,532,360 | 10/1970 | Leising et al. | 280/150 |
| 3,618,980 | 11/1971 | Leising et al. | 280/150 |
| 3,632,133 | 1/1972 | Haas | 280/150 |
| 3,752,501 | 8/1973 | Daniel et al. | 280/729 |
| 3,762,741 | 10/1973 | Fleck et al. | 280/729 |
| 3,985,076 | 10/1976 | Schneiter | 102/39 |
| 4,278,638 | 7/1981 | Nilsson et al. | 422/166 |
| 4,296,084 | 10/1981 | Adams et al. | 423/151 |
| 4,530,516 | 7/1985 | Adams et al. | 280/741 |
| 4,547,342 | 10/1985 | Adams et al. | 422/166 |
| 4,561,675 | 12/1985 | Adams et al. | 280/734 |
| 4,578,247 | 5/1986 | Bolleau | 422/165 |
| 4,590,041 | 5/1986 | Hill | 422/165 |
| 4,722,551 | 2/1988 | Adams | 280/736 |
| 4,943,086 | 7/1990 | Cunningham | 280/741 |
| 5,249,824 | 10/1993 | Swann et al. | 280/729 |

FOREIGN PATENT DOCUMENTS

| | | |
|---|---|---|
| 47-30045 | 11/1972 | Japan . |
| 50-16057 | 6/1975 | Japan . |
| 63-301144 | 12/1988 | Japan . |

*Primary Examiner*—Sherman Basinger
*Attorney, Agent, or Firm*—Weingram & Zall

[57] ABSTRACT

An air bag for use in connection with a gas generator is provided. The air bag is of a double-wall construction. The air bag is fitted to the housing of a gas generator and a gas jet opening for allowing the air bag to communicate with the housing is provided. A gas generated by the gas generator due to an impact is charged into the air bag. The air bag has a double-wall structure including a first air bag and a second air bag having a greater capacity than the first air bag disposed about and attached to the first air bag. The first air bag constitutes an air storage chamber which receives air from the atmosphere through an air intake path and stores the air. A gas storage chamber is formed between the first and second air bags which receives a combustion gas from the gas jet opening and temporarily stores the combustion gas. The air intake path is typically a hollow path between the atmosphere and the air storage chamber. The first air bag has an opening therein which establishes communication between the gas storage chamber and the air storage chamber.

7 Claims, 3 Drawing Sheets

AIR BAG HAVING DOUBLE-WALL CONSTRUCTION

BACKGROUND OF THE INVENTION

1. Field of The Invention

This invention relates to an air bag for use in connection with a gas generator for protecting a passenger from impact, and more particularly to an air bag having a double-wall structure.

2. Prior Art

In conventional gas generators, an air bag consists of a single bag-like member, and a combustion gas is discharged into this bag-like member.

Conventional gas generators need a predetermined quantity of combustion gas for inflating the air bag. Therefore, a predetermined quantity of a gas generating agent for generating this combustion gas is also necessary. Furthermore, a predetermined quantity of a filter must be secured in order to filtrate and cool the combustion gas.

Accordingly, since an accommodation space for storing predetermined quantities of the gas generation agent, filter etc., must be secured inside the gas generator, it has not been possible conventionally to reduce the size of the gas generators.

U.S. Pat. No. 3,532,360 to Leising, et al, discloses a gas generating apparatus having a housing, a gas generating section, a coolant chamber, and inflatable air bag. The housing is generally bowl shaped and includes a bottom wall and a side wall. The gas generator is separated from an air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising. et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the materials towards the walls of the chamber in which they are positioned, causing the materials to travel in a generally circular pass, thereby enhancing combustion of the propellant. Because of their mass and velocity, reacting particles are kept in the chamber until fully consumed. A gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas also influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled into an inflatable structure.

U.S. Pat. No. 4,296,084 to Adams et al, discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al, discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure of an air bag comprising a lattice configuration or a multiple pillar-shaped configuration so that less air is required for inflation of the air bag.

Japanese Patent No. JP 47-30045 to Koryo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

OBJECTS AND SUMMARY OF THE INVENTION

The present invention provides an air bag with a double-wall structure which decreases the amount of gas needed to effectively inflate the air bag. The air bag of this invention is used in connection with a gas generator including a housing and a gas generation device disposed in the housing. The air bag is fitted to the housing and a gas jet opening allows the air bag to communicate with the housing. Inflation of the air bag helps to protect a passenger from an impact as gas generated by the gas generation device due to the impact is directed into the air bag.

The air bag of this invention is of a double-wall structure comprising a first air bag and a second air bag. The second air bag has a greater capacity than the first air bag and is disposed about and attached to the first air bag, forming a gas storage chamber therebetween. An air intake path is used to allow air to be introduced from the atmosphere to an air storage chamber within the first bag to allow for inflation of the air bag. The air intake path consists of a hollow path having one end opened to the atmosphere and the other end opened to the air storage chamber. Typically, the first and second bags are attached together by the air intake path. The first air bag also has an opening therein for allowing the gas storage chamber to communicate with the air storage chamber.

When the combustion gas is introduced via the gas jet opening into the gas storage chamber, the second air bag inflates rapidly, thereby also inflating the first air bag by pulling it to an open position. With the inflation of the first air bag, air is introduced into the air storage chamber inside the first air bag through the air intake path. The combustion gas is introduced into the air storage chamber via the opening between the gas storage chamber and the air storage chamber. In this way, the combustion gas is charged into the gas storage chamber, and the air and the combustion gas are charged into the air storage chamber. Accordingly, the quantity of the combustion gas can be saved in an amount equal to the amount of air used.

Accordingly, it is an object of this invention to provide an air bag for use in connection with a gas generator, which air bag reduces the amount of gas required for inflation of the air bag.

It is another object of this invention to provide an air bag for use in connection with a gas generator, which air bag is a double-wall construction.

It is still another object of this invention to provide an air bag for use in connection with a gas generator, which air bag may be used in connection with a gas generator of reduced size because of the reduced amount of gas generant needed to produce the reduced amount of gas for inflation of the air bag.

It is yet another object of this invention to provide an air bag for use in connection with a gas generator, which air bag may be quickly inflated because of the reduced amount of gas needed for inflation.

BRIEF DESCRIPTION OF THE DRAWINGS

These and further objects of the present invention will become apparent to those skilled in the art from review of the following Detailed Description of the Invention and accompanying drawings in which.

DETAILED DESCRIPTION OF THE INVENTION

Figure 1:
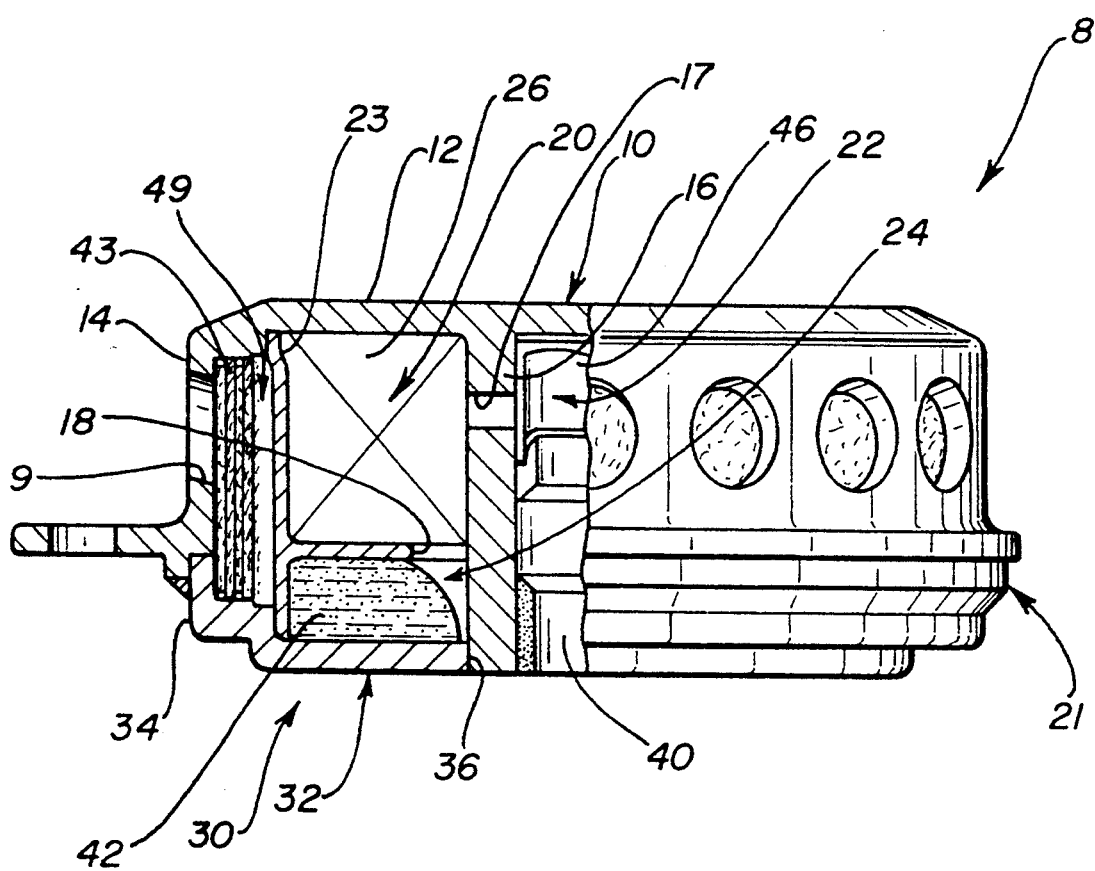
FIG. 1 is a semi cross-sectional view of a gas generator for use with an air bag having a double-wall structure according to the present invention.

FIG. 1 is a semi cross-sectional view of a gas generator 8 that may be equipped with an air bag having a double-wall structure in accordance with the present invention. The housing of this gas generator, indicated generally at 21, comprises a diffuser shell 10 and a closure shell 30. The diffuser shell 10 and the closure shell 30 each have a circular part, 12 and 32 respectively, and an outer wall, 14 and 34 respectively, formed around the outer peripheral portion of the circular parts 12 and 32. The diffuser shell 10 is equipped at the center of the circular part 12 with a center tube 16 which is formed integrally with the circular part 12. The top of the center tube 16 extends to the position on the outer surface of the closure shell 30. The closure shell 30 is equipped with a hole 36 into which this center tube 16 can be fitted.

The inside 20 of the housing 21 is defined in the circumferential direction by the center tube 16. An ignition device chamber 22 is formed inside the center tube 16. A combustion chamber 26 and a coolant chamber 24 are formed outside the ignition device chamber 22 by a combustion ring 23, and a filter chamber 49 is formed in such a way as to encompass the combustion chamber 26.

A squib (igniter) 40 and an enhancer (transfer charge) 46 are disposed in the ignition device chamber 22 and a gas generating agent (not shown) is loaded into the combustion chamber 26. A coolant 42 and a filter 43 are disposed in a coolant chamber 44 and a filter chamber 49, respectively.

An opening 17 is defined between the ignition device chamber 22 and the combustion chamber 26 for transmitting the flame of the transfer charge 46 to the combustion chamber 26, and an opening 18 for introducing the gas generated in the combustion chamber 26 is defined between the combustion chamber 26 and the coolant chamber 24. The coolant chamber 24 and the filter chamber 49 communicate with each other via an opening, not shown, and an opening for introducing a gas passing through the coolant and the filter, that is, a jet port 9, is disposed on the outer wall 14 of the diffuser shell between the filter chamber 49 and the air bag (FIG. 2).

Figure 2:
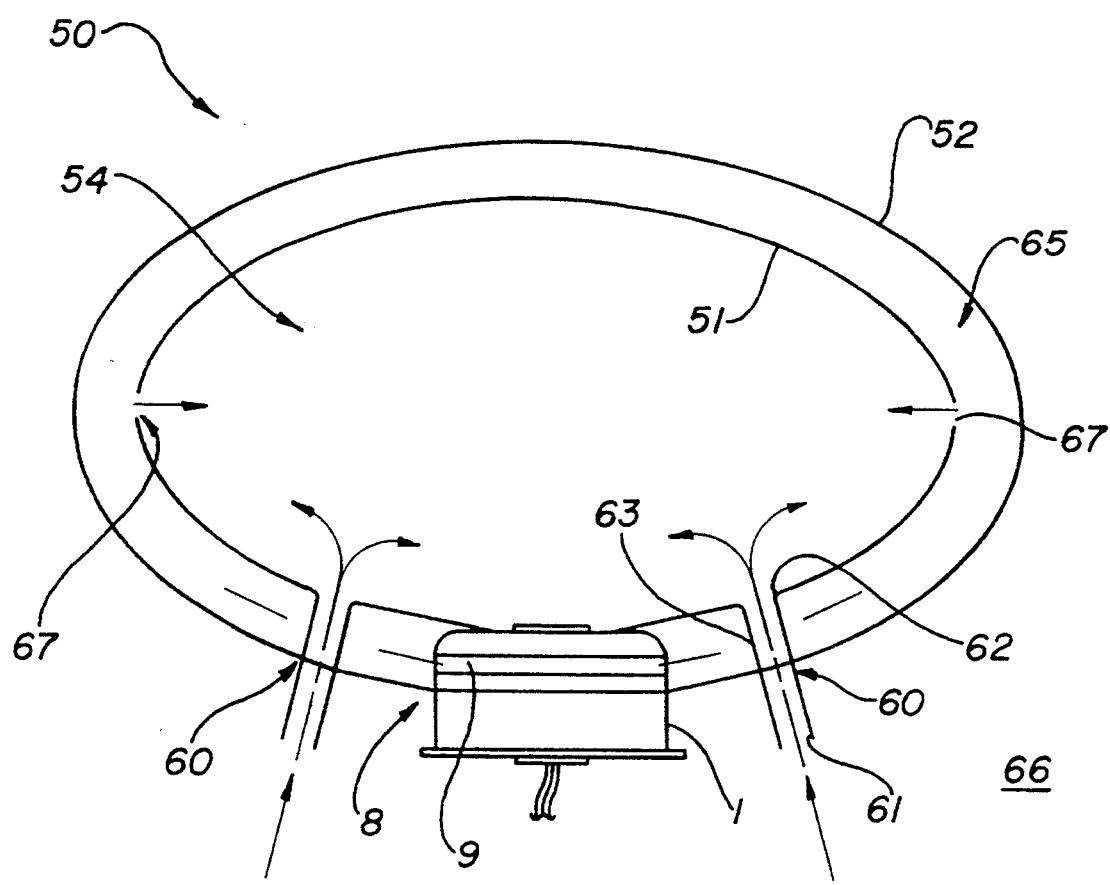
FIG. 2 is a schematic view of an embodiment of an air bag in accordance with the present invention.

FIG. 2 is a schematic view of the air bag, indicated generally at 50, in one embodiment of the present invention. The air bag 50 is fitted to the diffuser shell 10 of the gas generator 8 and includes a first air bag 51 and a second air bag 52. Second air bag 52 has a greater capacity than the first air bag 51 and is disposed about and attached to the first air bag 51. The first air bag 51 constitutes an air storage chamber 54 which receives air from the atmosphere 66 through an air intake path 60 and stores the air therein. A gas storage chamber 55 which receives the combustion gas from the jet port 9 of the gas generator and temporarily stores the combustion gas is disposed between the first air bag 51 and the second air bag 52.

At least one air intake path is provided to permit air to enter the air storage chamber 54. Typically, a plurality of air intake paths 60 are disposed in the air bag. Each air intake path 60 comprises a hollow path, one end of which opens to the atmosphere 66 via an opening 61 and the other end of which opens to the air storage chamber 54 via an opening 62. The atmosphere 66 and the gas storage chamber 55 are cut off from each other by a wall 63 of air intake path 60. Accordingly, the high pressure combustion gas does not leak out into the atmosphere.

The diameter of the air intake path 60 is of a size such that the amount of air required for the air storage chamber 54 to inflate sufficiently within a predetermined time can be taken into the air storage chamber 54. The first air bag 51 and the second air bag 52 are typically connected to each other by the air intake paths 60, typically near the mouth of each bag. Other connections between the first and second air bags may be included and positioned appropriately. The first and second air bags may be interconnected by other attachment means such as ribs, seams, welds, etc. Openings 67 for establishing communication between the gas storage chamber 55 and the air storage chamber 54 are defined in the first air bag 51.

When a sensor (not shown) is activated by an impact, an electric signal is sent to the initiator of the squib 40 and the ignitor ignites the transfer charge 46. The high pressure and high temperature flame generated passes through the opening 17 and ignites the gas generating agent inside the combustion chamber 26. The gas which is generated inside the combustion chamber 26 passes through the opening 18 and then through the coolant 42 and the filter 43, and flows into the air bag 50 through the jet openings 9.

The high pressure combustion gas jetted substantially in the radial direction from the jet opening 9 expands inside the gas storage chamber 55 and the second air bag 52 rapidly inflates in the radial direction as well as in the axial direction. At the same time, the first air bag 51 is pulled open by the second air bag 52 and also inflates, and with this expansion air from the atmosphere is pulled into the air storage chamber 54 through air intake path 60. In this way, as combustion gas is charged in the gas storage chamber 55 and combustion gas is charged from the gas storage chamber 55 into the air storage chamber 54 through openings 67, the air and the combustion gas are charged into the air storage chamber 54, the air bag inflates rapidly and forms a cushion between a passenger and a hard structure.

Figure 3:
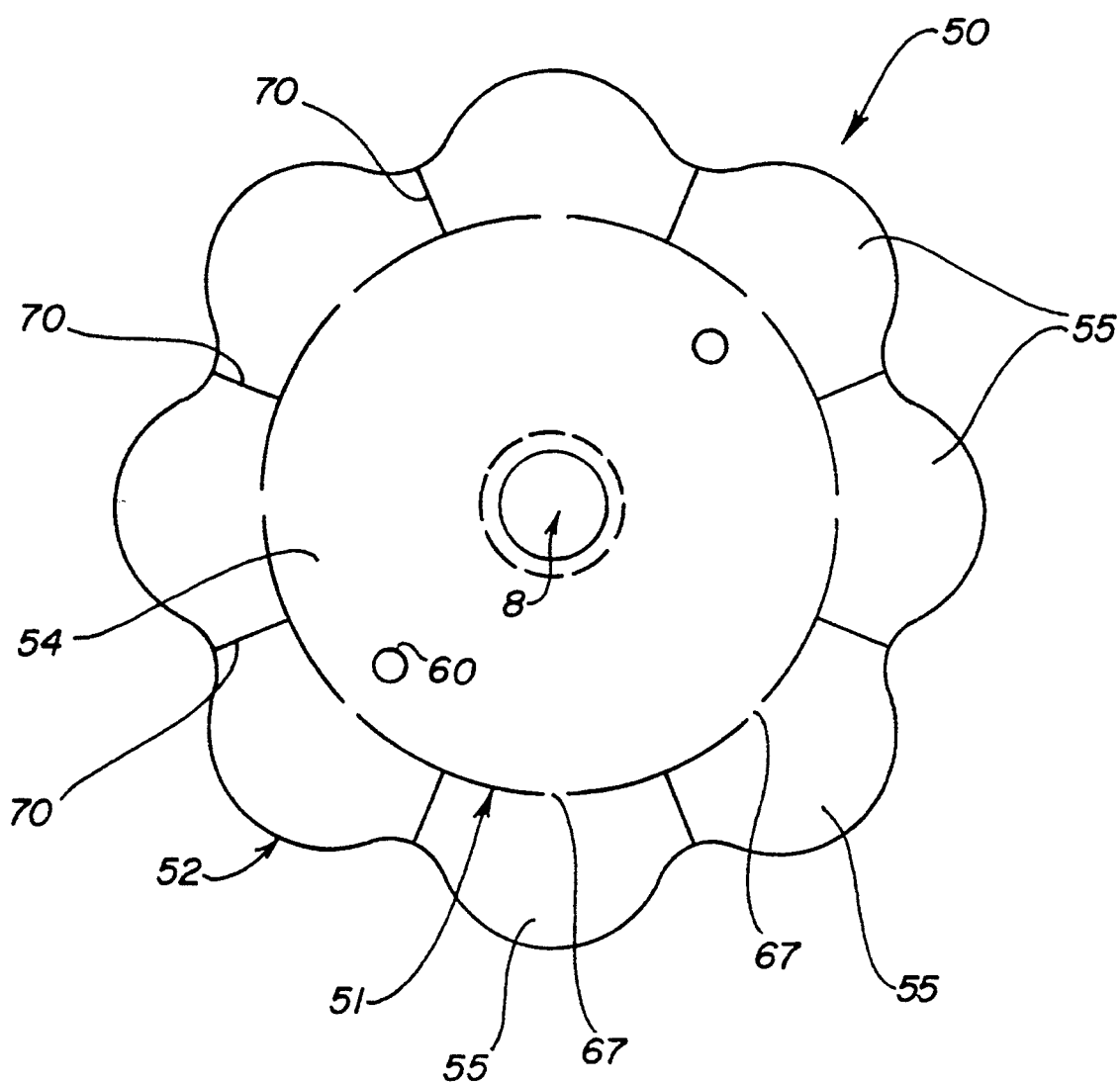
FIG. 3 is a cross-sectional view of another embodiment of the air bag in accordance with the present invention.

FIG. 3 depicts an alternative embodiment of the air bag 50 of the present invention. In this embodiment, the second air bag 52 is interconnected with the first air bag 51 by a plurality of rib members 70. The rib members 70 form a plurality of gas storage chambers 55. In this embodiment, a plurality of openings 67 are provided between the plurality of gas storage chambers 55 and the air storage chamber 54. Typically, there would be one opening 67 for each gas storage chamber 55. In this embodiment, the benefits resulting from a reduced amount of gas generant required to inflate the air bag are still present. This embodiment further provides a means of securing the first air bag to the second air bag to provide for uniform inflation of the air bag 50. Further benefits from this embodiment include structural rigidity provided by a plurality of gas storage chambers 55. Further embodiments providing various means of attachment between the first and second air bags are considered to be within the scope of this invention.

It is important to note that the double-walled air bag does not require openings 67 and may be designed without them. Openings 67 serve to enhance the ability of the air bag to handle the gas charge. The communication between the gas storage chamber 55 and the air storage chamber 54 and the atmosphere 66 permit the air bag to be designed of a lighter weight material than a conventional air bag and thus permit the associated cost saving and dimension saving benefits.

It is also important to note that the size of the gas storage chamber can be varied as a function of the first air bag or the second air bag. Similarly, the shape of the gas storage chamber may also be so modified. It is advantageous to have a wider distance between the first and second air bags at the top of the bag near the contact point for impact with a body. Similarly, it is more desirable to have a narrower dimension between the first and second air bags towards the bottom of the air bag where the gas is under high pressure. By making the space between the first and second air bags narrower at the bottom of the air bag construction, the air intake pass 60 can be reduced to a minimum distance to facilitate air flow from the atmosphere 66 into the air storage chamber 54.

Use of the air bag of the present invention results in a savings of the amount of combustion gas needed to inflate the air bag. The combustion gas can be saved as much as the volume of the air inside the air bag. Accordingly, the amount of the gas generating agent for generating this combustion gas can be reduced remarkably. The capacity of the gas combustion chamber for storing the gas generation agent can be reduced as well. Further, the amount of the filter required for filtrating and cooling the combustion gas becomes smaller and the capacity of the storage chamber for storing the filter can also be reduced. As a result, a reduction of the size and weight of the gas generator can be accomplished. Since the amounts of the gas generating agent, filter, etc., become smaller, the cost of production becomes more advantageous.

Because of the reduction of the size of the gas generator needed to inflate the double-wall air bag of the present invention, this safety feature may be used in places previously too small for use of a conventional air bag, i.e., this device could be used in positions along a car door to prevent against injury associated with crosswise impacts to the car.

Because of the decrease in the volume of gas generant required to inflate the air bag, and because air is drawn from within the atmosphere of the car to inflate the air bag, pressurization of the passenger compartment due to inflation of the air bag is reduced. Further, since the combustion gas is mixed with air in the air storage chamber, the resulting mixture, when expelled into the passenger compartment upon deflation of the air bag, is cooler than that from a conventional air bag and it has a lessened gas concentration.

Additionally, since the amount of the generated gas is small, the generated pressure can be lower and hence, the thickness of the outer shell of the gas generator can be reduced. From this aspect, too, the air bag of the present invention can contribute to the reduction of the dimension and weight of the gas generator thereby leading to additional cost reductions.

Having thus described the invention in detail, it is understood that the foregoing description is not intended to limit the spirit and scope thereof. What is desired to be protected by Letters Patent is set forth in the appended claims.

What is claimed is:

1. An air bag for use in connection with a gas generator comprising:
    a first air bag attached to a gas generator, the first air bag forming an air storage chamber;
    a second air bag disposed about the first air bag and coacting with said gas generator to form a gas storage chamber substantially enveloping the first air bag;
    an air intake path connecting the first and second air bags, the air intake path extending from the second air bag through the first air bag for communicating the air storage chamber with the exterior of the second air bag;
    at least one aperture in the first air bag for communicating the gas storage chamber with the air storage chamber
    wherein, gas generated by the gas generator is introduced into the gas storage chamber to inflate the second air bag which pulls the first air bag into an inflated position causing ambient air to be pulled from the exterior of the second air bag through the air intake path and into the air storage chamber.

2. The apparatus of claim 1 wherein the air intake path comprises a tube extending between the first and second air bags.

3. An air bag for use in connection with a gas generator comprising:
    a first air bag attached to a gas generator forming an air storage chamber therein;
    a second air bag disposed about the first air bag and coacting with said gas generator to form a gas storage chamber substantially enveloping the first air bag;
    an air intake path connecting the first and second air bags, the air intake path extending between the first and second air bags to communicate the air storage chamber of the first air bag with the atmosphere on the exterior of the second air bag;
    at least one aperture in the first air bag for communicating the gas storage chamber with the air storage chamber;
    wherein, upon impact, a gas produced by a gas generator is introduced into the gas storage chamber to inflate the second air bag which causes the first air bag to be pulled into an inflated position and causes air from the atmosphere to be pulled into the air storage chamber to inflate the air bag.

4. The apparatus of claim 3 wherein the air intake path comprises a tube extending through the gas storage chamber between the first air bag and the second air bag.

5. An air bag for use in connection with a gas generator comprising:
    a first air bag attached to a gas generator and forming an air storage chamber therein;
    a second air bag attached to said gas generator and disposed about the first air bag;
    a plurality of ribs extending between the first air bag and the second air bag to attach the first air bag to the second air bag;
    a plurality of gas storage chambers formed between the first air bag, the second air bag and adjacent ribs;
    at least one air intake path communicating the air storage chamber within the first air bag with the atmosphere on the exterior of the second air bag;
    at least one aperture in the first air bag to provide communication between the gas storage chambers and the air storage chamber;
    wherein, upon impact, a gas produced by a gas generator, is introduced into the longitudinal gas storage chambers to inflate the second air bag which causes the first air bag to be pulled into an inflated position causing air from the atmosphere to be pulled into the air storage chamber to inflate the air bag.

6. The apparatus of claim 5 further comprising at least one aperture between each gas storage chamber and the air storage chamber to allow gas to flow from the gas storage chambers to the air storage chamber.

7. The apparatus of claim 6 wherein the air intake path comprises a tube extending between the first air bag and the second air bag.

* * * * *